_United States Patent_ [19]

Billet et al.

[11] 3,914,291

[45] Oct. 21, 1975

[54] PROCESS FOR SPLITTING CYCLOALIPHATIC HYDROPEROXIDES

[75] Inventors: Lucien Billet, Lyon; Michel Jouffret, Francheville-La-Bas, both of France

[73] Assignee: Rhone-Poulenc Industries, Paris, France

[22] Filed: May 31, 1974

[21] Appl. No.: 474,965

[30] Foreign Application Priority Data
June 4, 1973   France .............................. 73.20226

[52] U.S. Cl. .......... 260/487; 260/485 R; 260/635 A; 260/635 R
[51] Int. Cl.$^2$ .................. C07C 29/14; C07C 67/00
[58] Field of Search ............ 260/488 F, 487, 485 R, 260/635 A, 635 R

[56] References Cited
UNITED STATES PATENTS

| | | | |
|---|---|---|---|
| 3,428,656 | 2/1969 | Weiss et al. | 260/343 |
| 3,492,339 | 1/1970 | Hawkins et al. | 260/488 F |
| 3,590,080 | 6/1971 | Beesley et al. | 260/485 R |
| 3,689,534 | 9/1972 | Brunie et al. | 260/488 F |
| 3,784,567 | 1/1974 | Isard et al. | 260/488 F |

_Primary Examiner_—Vivian Garner
_Attorney, Agent, or Firm_—Stevens, Davis, Miller & Mosher

[57] ABSTRACT

A process for ring fission of cycloalkyl peroxides is provided giving rise to greater selectivity of ω-acyloxyalkanal, said process being carried out with trifluoroacetic acid or maleic anhydride.

8 Claims, No Drawings

PROCESS FOR SPLITTING CYCLOALIPHATIC HYDROPEROXIDES

The present invention relates to a process by means of which cycloalkyl hydroperoxides are split to yield products which contain simultaneously an esterified hydroxyl group and an aldehyde group.

It is known to convert tertiary cyclohexyl hydroperoxides of the general formula:

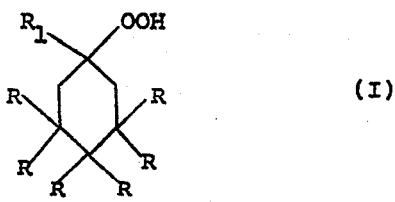

in which R represents a hydrogen atom or an alkyl group and $R_1$ represents an alkyl group, by splitting them in an acid medium, to give products which possess two reactive groups in the molecule. For example, U.S. Pat. No. 2,717,264 states that the action of formic acid on methylcyclohexyl hydroperoxide leads to the formation of a ketol, namely 7-hydroxy-2-heptanone, produced from its formic acid, ester, namely 7-formyloxy-2-heptanone, by methanolysis.

Furthermore, PRITZKOW and MULLER [Ber., 89, 2321 (1956)] have produced 7-acetoxy-2-heptanone by decomposing methylcyclohexyl hydroperoxide by means of perchloric acid in glacial acetic acid. However, the authors mention that, under the same conditions, they did not obtain 6-acetoxyhexanal starting from cyclohexyl hydroperoxide.

A process has been proposed in French Pat. No. 1,584,939 which makes it possible to decompose secondary hydroperoxides such as cycloalkyl hydroperoxides, particularly cyclohexyl, cyclooctyl and cyclododecyl hydroperoxides, to form ω-formyloxyalkanals, by means of formic acid at a temperature from 50°C. to the boiling point of the reaction mixture. Nevertheless, during the reaction, by-products such as cycloalkanones and cycloalkyl formates form and this considerably reduces the yield of ω-formyloxyalkanals.

These ω-acyloxyalkanals are very valuable intermediates in syntheses; for example, they can be converted easily to α,ω-alkanediols or to ω-hydroxyalkanoic acids which are valuable precursors for producing synthetic resins and fibres. Accordingly, when they are being produced it is of great importance that the least possible amount of undesirable by-products is produced as well.

According to the invention there is provided a process for splitting secondary cycloalkyl hydroperoxides of the general formula:

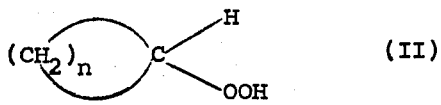

in which the symbol $n$ represents an integer from 5 to 11 which comprises reacting the hydroperoxide with trifluoroacetic acid or maleic anhydride. This process gives improved selectivity with respect to the production of acyloxyalkanals.

The hydroperoxides of the formula (II) which are used as starting materials can be produced from the corresponding cycloalkanols, or from cycloalkanones by oxidation by means of hydrogen peroxide, or from cycloalkanes by oxidation in the liquid phase, without a catalyst, by means of a gas containing molecular oxygen. It is possible, for example, to oxidise cyclohexane in accordance with the processes described in French Pat. Nos. 1,404,723 and 1,491,518, or the higher homologues of cyclohexane in accordance with the process described in French Pat. No. 1,429,569, and then to purify the hydroperoxide formed in accordance with conventional processes, for example by conversion to the sodium salt and treatment with carbon dioxide.

The trifluoroacetic acid used in the process of this invention is preferably practically anhydrous so that it does not contain more than 2% by weight of water. The maleic anhydride used can be the commercial pure anhydrous product.

Suitably, the process is carried out by introducing, at the desired temperature, the hydroperoxide in the pure state into trifluoroacetic acid or maleic anhydride which has been melted beforehand. However, for safety reasons, it is also possible to use the hydroperoxide in the form of a solution in a suitable solvent. For example, it is possible to use the hydroperoxide in solution in the hydrocarbon from which it is derived by oxidation; it is particularly advantageous to use directly the crude solution which results from the oxidation process and which contains the hydroperoxide. In general terms, the reaction may be carried out at a temperature from 0°C. to 110°C.

When trifluoroacetic acid is used as the splitting agent, it is found, and this constitutes another advantage of the present process, that a high temperature is not required in order to effect the splitting with good selectivity. Reaction temperatures below 50°C., for example of from 0°C. to 40°C., are usually sufficient and the results are generally better than those obtained using boiling formic acid in accordance with the process described in French Pat. No. 1,584,939. The use of temperatures below 50°C., with formic acid results in a considerable slowing down of the deperoxidation reaction which then takes place preferentially towards the formation of the cycloalkanone.

With maleic anhydride, the reaction is suitably carried out at a temperature from the melting point of the anhydride (53°C.) to a temperature which should generally not exceed 110°C.

Since the reaction is exothermic, it is convenient to keep the reaction temperature within the limits indicated above by supplying the hydroperoxide or the solution in which it is present at a suitable rate. Generally, amounts of splitting agent (trifluoroacetic acid or maleic anhydride) of at least 5 mols, for example from 5 mols to 25 mols, per mol of hydroperoxide are very suitable; these compounds can act as diluents and it is quite possible to exceed the upper end of this range without affecting the splitting process. When the splitting is effected in the presence of a suitable solvent, the concentration of the reagents (splitting agent and hydroperoxide) in the solvent is not critical.

After having introduced the hydroperoxide, the reaction can be allowed to continue for a few moments at the desired temperature, if this is judged to be necessary. In the case of trifluoroacetic acid, it is advisable to remove any unreacted acid in order to prevent degradation reactions; this removal can be effected advantageously by distillation of a volatile derivative such as, for example, the methyl ester produced by simply adding methanol to the medium.

The reaction mixture can be treated in different ways. The ω-trifluoroacetoxyalkanals or the ω-hydroxyalkanal mono-maleates formed can be isolated, but it is preferred to treat the reaction mixture directly so as to convert these compounds, in situ to α, ω-alkanediols which are industrially valuable products, by applying any known method, for example by hydrolysis e.g. alcoholysis or saponification of the ester group, and by hydrogenation of the aldehyde group, for example under pressure in the presence of a catalyst based on a noble metal such as ruthenium.

The following Examples further illustrate the present invention.

EXAMPLE 1

57 g. (0.5 mol) of anhydrous trifluoroacetic acid are introduced into a glass reactor which is equipped with a central stirrer, a reflux condenser, a dropping funnel and a thermometer and which is cooled externally by a bath of iced water; 5.99 g. of cyclohexyl hydroperoxide, of purity 97% by weight, (0.05 mol) are then introduced gradually over 7 minutes, keeping the reaction temperature at 20°C.

once the addition is complete, 90 cm³ of methanol are introduced into the mixture and the methyl trifluoroacetate formed is distilled (boiling point: 40°C.).

45 cm³ of water, 0.2 g. of concentrated sulphuric acid and 0.05 g. of ruthenium in the form of a catalyst consisting of 5% by weight of the metal deposited on carbon black are added to the resulting mixture which weighs 34 g; the whole is then introduced into a stainless steel autoclave which is shaken and in which a hydrogen pressure of 50 bars is set up. The autoclave is then heated to 100°C., and is kept under these conditions for 2 hours.

After cooling and releasing the gas, the catalyst is filtered off and the resulting solution is analysed by vapour phase chromatography. 3.29 g. of hexane-1,6-diol and 1.16 g. of cyclohexanol, corresponding to respective yields of 55.6% and 23% relative to the pure hydroperoxide employed, are thus obtained.
Comparative test using formic acid at a low temperature (20°C.).

17 g. (0.363 mol) of formic acid, the water content of which is 1.7% by weight, are introduced into a glass reactor equipped as in Example 1, and 3 g. of cyclohexyl hydroperoxide, containing 97% by weight of pure hydroperoxide, (0.025 mol), are then introduced rapidly whilst keeping the reaction temperature at 20°C., during the operation. The mixture is stirred at this temperature for 17 hours until deperoxidation is complete.

0.082 g. of 6-formyloxy-hexanal, 0.173 g. of cyclohexyl formate and 1.5 g. of cyclohexanone, corresponding to respective yields of 2.3%, 5.4% and 61% relative to the pure hydroperoxide employed, are obtained as measured by vapour phase chromatography in the reaction mixture.

EXAMPLE 2

57 g. (0.5 mol) of anhydrous trifluoroacetic acid are introduced into a glass reactor which is equipped as in Example 1 and is heated externally, the trifluoroacetic acid is heated to 50°C., and then 60 g. of a solution of cyclohexyl hydroperoxide in cyclohexane, containing 10% by weight of pure hydroperoxide (0.056 mol) are introduced gradually over 11 minutes, keeping the temperaure at 50°C.

When the addition is complete, the reaction is continued for a further 30 minutes at 50°C., 90 cm³ of methanol are then added and the procedure described in Example 1 is followed exactly.

3.27 g. of hexane-1,6-diol and 1.38 g. of cyclohexanol, corresponding to respective yields of 53.7% and 26.8% relative to the pure hydroperoxide employed, are obtained as measured by vapour phase chromatography.

EXAMPLE 3

29.4 g. (0.3 mol) of maleic anhydride are introduced into a glass reactor which is equipped as in Example 1 and is heated externally; the maleic anhydride is heated to 100°C., and then 3.03 g. of cyclohexyl hydroperoxide of purity 93.5% by weight (0.024 mol) are then introduced over the course of 1 minute. The mixture is stirred for 7 minutes at 100°C., and then 50 cm³ of methanol are added and the whole is allowed to cool.

30 cm³ of water and 0.145 g. of ruthenium in the form of a catalyst consisting of 5% by weight of the metal deposited on carbon black are then added to the 72 g. of the solution in methanol, and the whole is then introduced into a stainless steel autoclave which is shaken and in which a hydrogen pressure of 50 bars is set up. The autoclave is then heated to 100°C., and is kept under these conditions for 2 hours.

After cooling and releasing the gas, the catalyst is filtered off and the resulting solution is stirred under reflux for 1 hour with an excess of a 40% by weight aqueous solution of sodium hydroxide.

1.26 g. of hexane-1,6-diol and 0.48 g. of cyclohexanol, corresponding to respective yields of 44% and 19.8% relative to the pure hydroperoxide employed, are obtained as measured by vapour phase chromatography in the final mixture.

We claim:

1. Process for ring fission of a cycloalkyl hydroperoxide of the general formula:

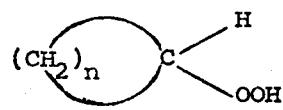

in which $n$ represents an integer from 5 to 11, which comprises reacting in the liquid phase at a temperature from 0°C. to 110°C. the hydroperoxide with an acid reactant selected from trifluoroacetic acid and maleic anhydride to produce the corresponding ω-acyloxyalkanal.

2. Process according to claim 1 in which the hydroperoxide is used as a solution in the corresponding hydrocarbon from which it is obtained by oxidation.

3. Process according to claim 1 in which the acid reactant is trifluoroacetic acid and the reaction is carried out at a temperature from 0°C. to 40°C.

4. Process according to claim 1 in which at least 5 mols of the trifluoroacetic acid or maleic anhydride are used per mol of hydroperoxide.

5. Process according to claim 1 in which $n$ is 5.

6. Process according to claim 1 in which the ω-acyloxyalkanal formed is converted, in situ, by hydrogenation and hydrolysis to give the corresponding α,ω-alkane-diol.

7. Process according to claim 6 in which the hydrogenation is carried out under pressure in the presence of a ruthenium catalyst and the hydrolysis is carried out by saponification or alcoholysis.

8. Process for preparing 1,6-hexane diol which comprises reacting cyclohexylperoxide with an acid reactant selected from trifluoroacetic acid and maleic anhydride, at least 5 mols of acid reactant being used per mole of peroxide, at a temperature from 0°C. to 110°C., and hydrolysing and hydrogenating the resulting reaction product.

* * * * *